United States Patent [19]
Paulson et al.

[11] 3,850,729
[45] Nov. 26, 1974

[54] APPARATUS AND METHOD FOR PRODUCING A BUSINESS FORM ARTICLE

[75] Inventors: William T. Paulson, Kettering, Ohio; David M. Davidson, deceased, late of Dayton, Ohio by Clara A Davidson, executrix; L. Eldean Gilbert, West Milton, Ohio; Henry Gabbard, Xenia, Ohio; Richard D. Bemus, Troy, Ohio

[73] Assignee: The Standard Register Company, Dayton, Ohio

[22] Filed: July 12, 1973

[21] Appl. No.: 378,547

Related U.S. Application Data

[63] Continuation-in-part of Ser. No. 156,704, June 25, 1971, Pat. No. 3,776,755, which is a continuation-in-part of Ser. No. 800,167, Feb. 18, 1969, abandoned.

[52] U.S. Cl............ 156/390, 156/244, 156/247, 156/248, 156/268, 156/494, 156/500, 156/510, 156/584
[51] Int. Cl..................... B32b 31/12, B32b 31/18
[58] Field of Search .......... 156/244, 247, 390, 495, 156/500, 501, 584, 278, 248, 268, 494, 510; 117/36.4; 118/33, 38, 304, 324, DIG. 4

[56] References Cited
UNITED STATES PATENTS

| | | | |
|---|---|---|---|
| 2,766,717 | 10/1956 | Neidich et al. | 118/33 |
| 2,944,586 | 7/1960 | Yanulis | 156/500 |
| 3,078,822 | 2/1963 | Carter | 118/33 |
| 3,305,418 | 2/1967 | Behn | 156/247 |
| 3,413,184 | 11/1968 | Findlay et al. | 156/247 |
| 3,421,960 | 1/1969 | Arbit | 156/500 |
| 3,574,026 | 4/1971 | Kucheck | 156/247 |
| 3,749,629 | 7/1973 | Andrews et al. | 156/247 |
| 3,775,239 | 11/1973 | Snow | 156/244 |

Primary Examiner—Daniel J. Fritsch
Attorney, Agent, or Firm—Jacox & Meckstroth

[57] ABSTRACT

A continuous business sheet or paper-like web carries image transfer means which is supported by a thin plastics film or layer of tough flexible carrier material. The film or layer of carrier material is removably attached to the sheet and may be removed from the sheet before or after use of the transfer material. Thus, when desired, the transfer material is removed from the business sheet by removal of the carrier material and the business sheet is thus freed from the transfer material and from any problems which may be associated therewith.

11 Claims, 16 Drawing Figures

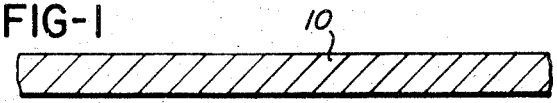
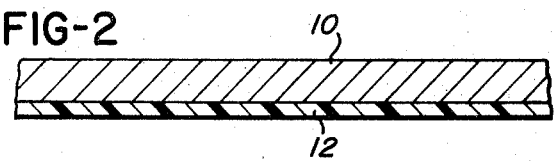
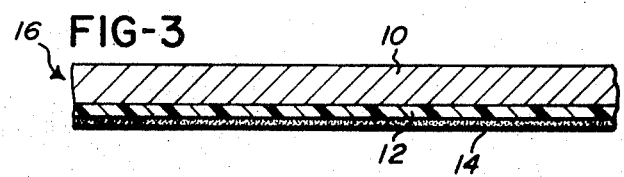
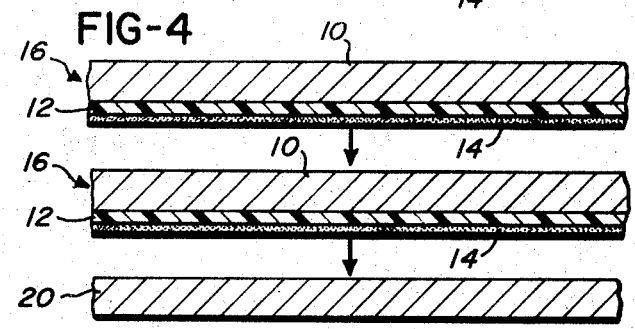
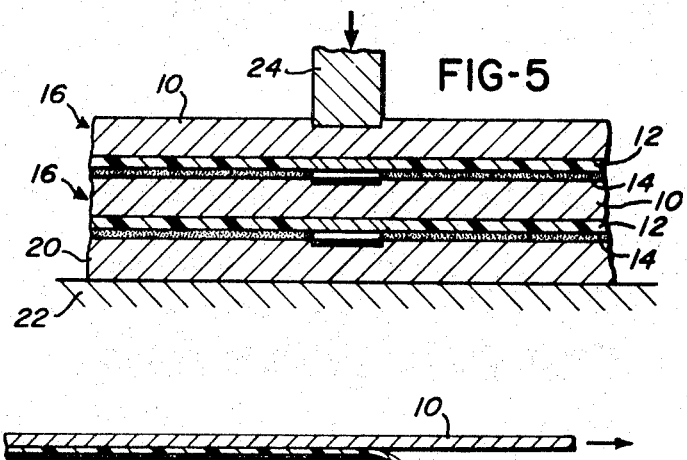
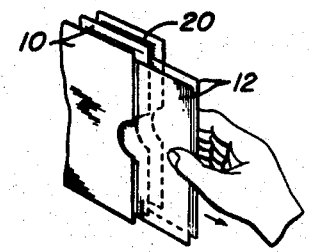
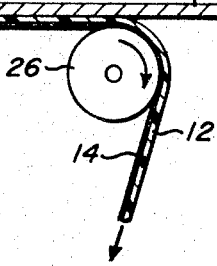

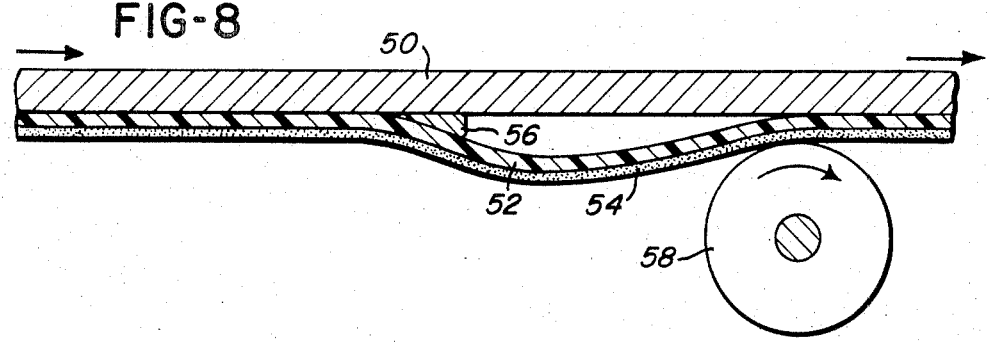
FIG-8
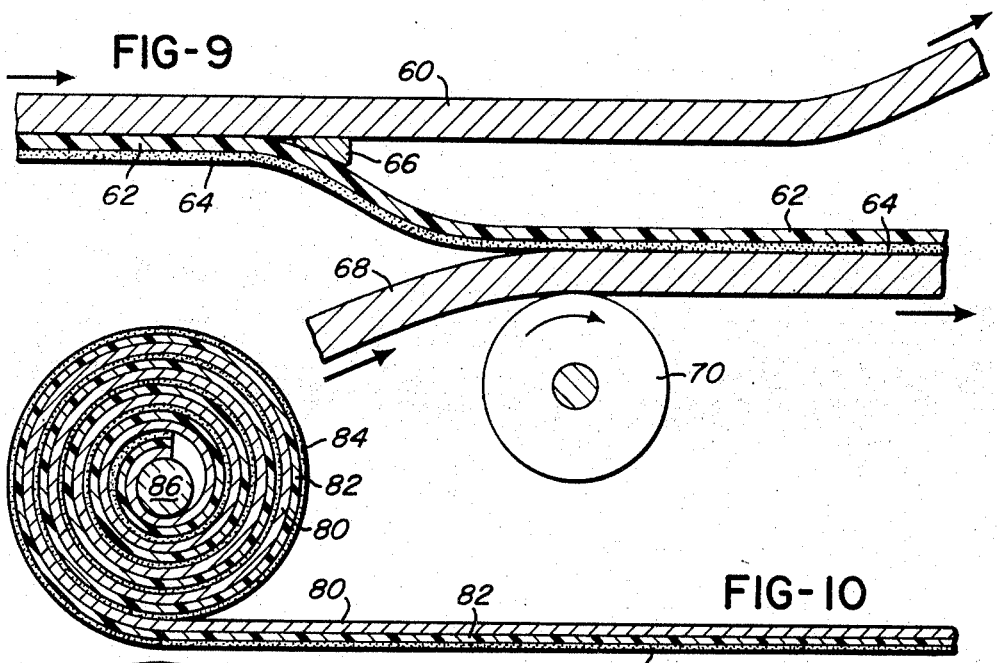
FIG-9
FIG-10
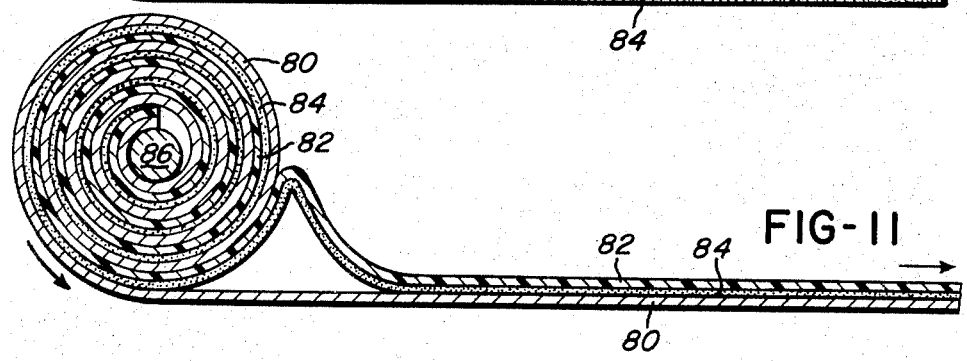
FIG-11
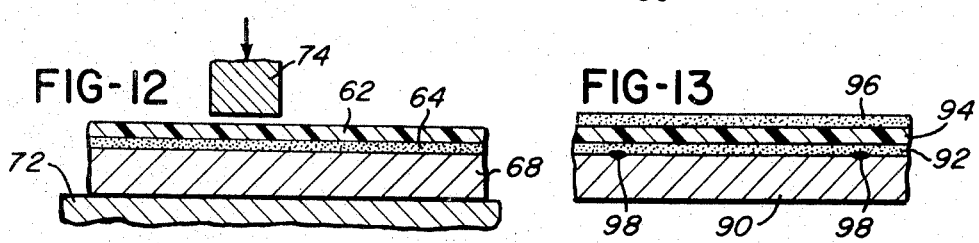
FIG-12   FIG-13

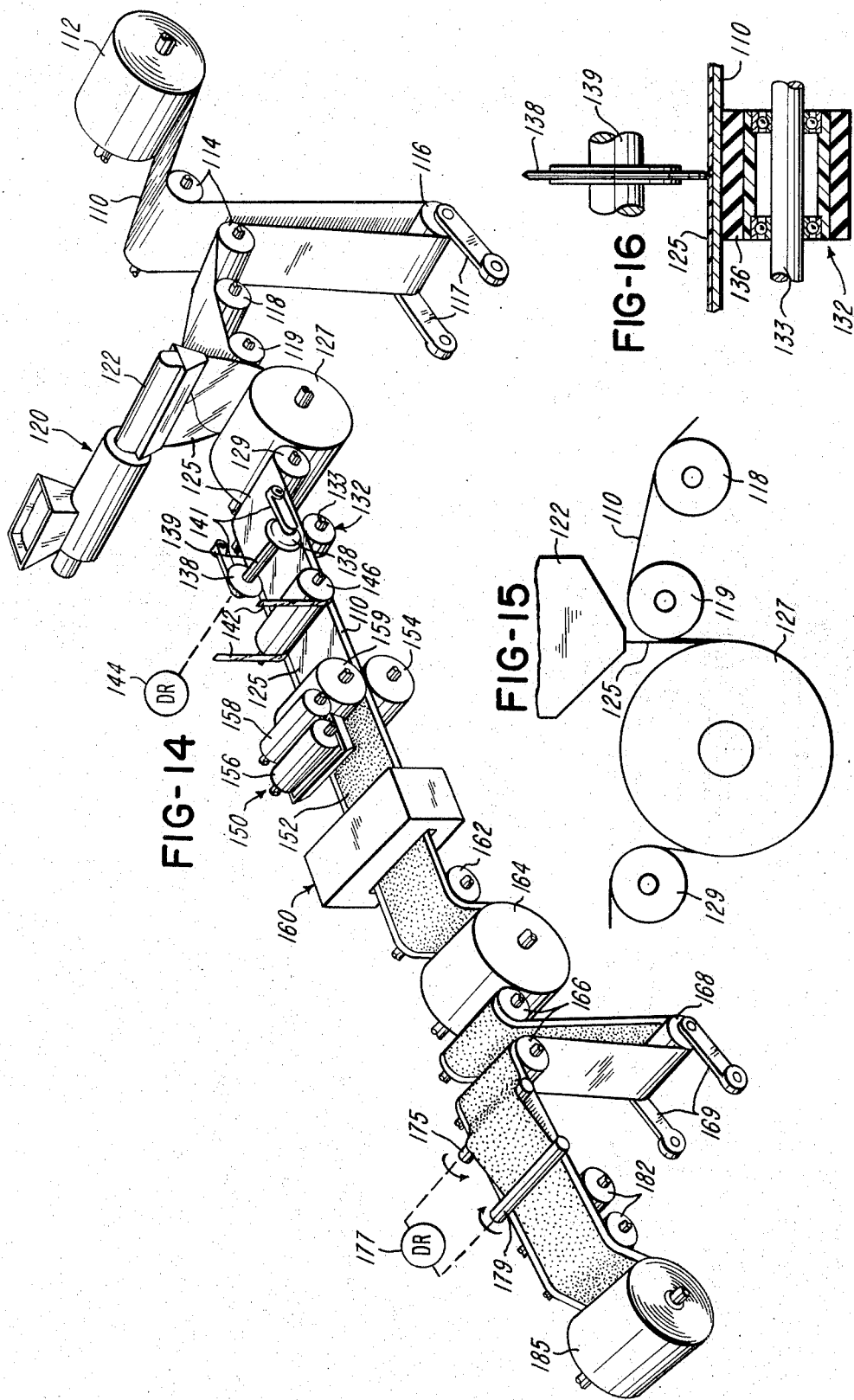

3,850,729

APPARATUS AND METHOD FOR PRODUCING A BUSINESS FORM ARTICLE

RELATED APPLICATION

This application is a continuation-in-part of copending U.S. Pat. application Ser. No. 156,704, filed June 25, 1971, now U.S. Pat. No. 3,776,755, which is a continuation-in-part of U.S. Pat. application Ser. No. 800,167, filed Feb. 18, 1969, now abandoned.

BACKGROUND OF THE INVENTION

A sheet of transfer paper, such as a sheet of carbon paper, comprising tissue or bond or the like as a substrate, is well known as a transfer element between two record sheets or between two sheets of information carrying paper. However, numerous problems are involved in the production and use of such sheets of transfer paper or carbon paper. For example, costs of production of such carbon paper are considerable. Also, the carbon paper is usually smudgy or dirty to handle. Furthermore, a sheet of carbonized paper has considerable thickness which adds to the thickness of a superposed set of record sheets. The thickness of the carbon paper, therefore, reduces the capability of a pressure or impact member to apply information by pressure or impact through a large number of sheets in a multicopy set. Furthermore, such carbonzied paper contributes to image distortion as a result of the fibrous nature of the paper.

It is an object of this invention to provide apparatus for producing a business sheet or the like which carries transfer material which is removable therefrom before or after use of the transfer material for transfer of information to another sheet.

Another object of this invention is to provide a method of producing such a business sheet.

Another object of this invention is to provide such transfer structure which produces high quality multicopy impressions.

It is another object of this invention to reduce the number of webs which must be collated in production of a unit to produce a given number of copies.

It is another object of this invention to provide means by which film coating and carbon coating can be applied in a single coating cycle.

It is another object of this invention to provide such structure and method which is relatively low in cost.

Other objects and advantages reside in the construction of the business sheet, the method of production thereof, and the mode of operation thereupon, as will become more apparent from the following description.

SUMMARY OF THE INVENTION

A sheet, such as a sheet of paper or web of paper-like material, serves as support means for a film or layer applied thereto, such as a film or layer of plastics material, such as polyethylene or ethylene copolymer of the like. The film or layer carries a coating of image transfer material such as carbon or the like or which may contain pigments and/or dyes, or may contain a dye precursor which develops visible color by chemical change only after transfer. The sheet is thus adapted to have information applied thereto, the information being simultaneously applied to another sheet or surface, which is in engagement with the image transfer material, and a limited portion of the image transfer material is transferred to the other sheet or surface. In some cases, pressure is applied to the first sheet or support sheet for applying information to a second sheet by use of image transfer material supported by the first sheet but without application of the information by printing or the like upon the first sheet. After application of information by means of the image transfer material, the film may be removed from the support sheet, carrying therewith the remaining image transfer material. Alternatively, the film may be removed from the support sheet and repositioned into engagement with the support sheet or into engagement with another sheet for the image transfer process. Thus, a sheet is provided which carries information and which is capable of transfer of information, and the imaging means is removable from the sheet through which image transfer occurs. Also disclosed is apparatus for producing the business form sheet or article.

BRIEF DESCRIPTION OF THE DRAWING

FIG. 1 is a fragmentary sectional view, somewhat enlarged, of a sheet or substrate which forms a portion of the structure of this invention.

FIG. 2 is a fragmentary sectional view showing the substrate or sheet to which a carrier film or layer has been applied in accordance with this invention.

FIG. 3 is a fragmentary sectional view showing a transfer unit which includes the substrate or sheet with the film or layer applied thereto and with image transfer material applied as a coating or layer to the carrier film or layer.

FIG. 4 is a sectional diagrammatic type of view illustrating the collating of a plurality of the transfer units of FIG. 3. This view also shows an image receptor sheet below the superposed transfer units.

FIG. 5 is a sectional view showing the elements of FIG. 4 arranged in superposed relationship as a set and illustrating image formation thereupon by application of an image-wise force.

FIG. 6 is a sectional diagrammatic type of view, drawn on a much smaller scale than the other figures, illustrating an apparatus and a method by which the film and the transfer material carried thereby may be removed from the sheet or substrate.

FIG. 7 is a perspective view illustrating another method of separation of a film from a substrate.

FIG. 8 is a sectional view illustrating a method of separation of a bonded film from a substrate and return of the film to a substrate, the film carrying image transfer material.

FIG. 9 is a sectional view illustrating a method of separation of a bonded film from a substrate and movement of the film to another substrate, and for moving the film and the image transfer material to another substrate so that the image transfer material is adjacent the substrate to which the film with the transfer material is moved.

FIG. 10 is a sectional view, drawn on a smaller scale than FIGS. 8 and 9, illustrating a substrate having a film bonded thereto, the film carrying image transfer material, the substrate with the film and the image transfer material being in a helical roll.

FIG. 11 is a sectional view of the substrate, film and transfer material of FIG. 10, but illustrating stripping of the film from the substrate as the film moves out of contact with the substrate and as the transfer material moves into engagement with the substrate.

FIG. 12 is a fragmentary sectional view, drawn on a larger scale than FIGS. 10 and 11, showing a superposed arrangement of film, transfer material, and substrate, the film carrying the transfer material. This figure also shows an impact or pressure member for applying an impression upon the film for transfer of an image through the transfer material to the substrate.

FIG. 13 is a fragmentary sectional view showing another modification of the structure of this invention.

FIG. 14 is a somewhat diagrammatic perspective view of apparatus for producing the business form article of the invention.

FIG. 15 is an enlarged diagrammatic elevational view of the film applying portion of the apparatus shown in FIG. 14; and FIG. 16 is an enlarged fragmentary section of the film stripping portion of the apparatus shown in FIG. 14.

DETAILED DESCRIPTION OF THE INVENTION

A suitable support sheet or substrate 10, such as a sheet of paper which is intended to carry information, is shown in FIG. 1. The support sheet 10 may be, for example, a sheet of bond paper or the like or any other suitable sheet of material. The sheet 10 may be a plain sheet or may be printed thereupon on either or both surfaces thereof, prior to becoming a part of a unit of this invention. The sheet 10 is deformable to the extent necessary to transmit pressure therethrough which is applied to a surface thereof.

A carrier film or layer 12 is applied to a surface of the support sheet 10 so that the sheet 10 with the carrier film 12 may appear in the manner illustrated in FIG. 2. The carrier film 12 is preferably tough, flexible, and somewhat resilient, and may be, for example, a material of the plastics class, such as polyethylene or polypropylene or an ethylene copolymer of a wax blend therefor, or the film material may consist of an asphalt based composition, or other suitable material.

The film 12 may cover a portion or portions of the sheet 10 or the entire surface of the sheet 10.

The film 12 may be attached to the sheet 10 in any suitable manner. The preferred method of attachment of the film 12 to the sheet is that of self-bonding. The term "self-bonding" includes attachment of the film 12 to the sheet 10 by application of pressure therebetween and/or by application of heat thereto so that the film self-bonds to the sheet. The term bonding also includes attachment of the film 12 to the sheet 10 by use of adhesive material or by mechanical means or the like. A relatively weak degree of bonding or attachment of the film 12 to the sheet 10 is desirable. The desired degree of self-bonding may be controlled by various methods such as by controlling the magnitude of heat and/or pressure applied to the film 12 and/or the sheet 10. Other factors affecting the degree of self-bonding include the method of attachment, the composition of the carrier film 12, the composition of the bonding material, the temperature of the carrier film 12 and of the sheet 10, surface conditions of the sheet 10 and the pressure of application of the carrier film 12 to the sheet 10. The sheet 10 may be treated with a light water spray or steam spray or other bond-controlling agent immediately prior to application of the carrier film 12 to the sheet 10 to reduce or control the degree of bonding of the carrier film 12 to the sheet 10.

The carrier film 12 is preferably extruded upon the sheet 10 or coated thereupon by a blade coating process. Alternatively, the film 12 may constitute a separate sheet or strip or lamination which is brought into contact with the sheet 10 and attached thereto.

Attachment of the carrier film 12 to the sheet 10 may be over the entire mutual area or at any portion of the mutual area. For example, attachment may be at or along randomly or regularly spaced lines or spots or areas, or attachment may be only along one or more edges or margins of the carrier film 12.

The carrier film 12 is of a material which is sufficiently deformable for transmission of pressure therethrough which is applied to the sheet 10. Preferably, the thickness of the carrier film 12 upon the sheet 10 is very limited. The carrier film 12 is preferably in the order of 0.00025 to 0.0005 inches in thickness. However, films of other thicknesses are satisfactory. For example, films of thicknesses greater than 0.001 inch have been found to be suitable. Also, films having a thickness as low as 0.00015 have been found satisfactory. A film of a dimension as set forth herein provides a total thickness of a set of transfer units which permits high quality multiple copy impressions.

The sheet 10 thus serves as support means for the relatively thin carrier film 12, enabling the film 12 to be utilized in strip or web form without undue stretching or breaking of the film 12.

An image transfer layer or transfer-imaging layer 14, for example, a coating of a carbon ink which may be wax based, or solvent based, or plastisol type or the like is applied to the surface of the carrier film 12. Preferably, the image transfer layer 14 is applied to the carrier film 12 after the carrier film 12 is applied to the sheet 10. However, in some cases, the image transfer layer 14 may be applied to the carrier film 12 prior to attachment of the film 12 to the sheet 10. The image transfer layer 14 may be applied to the carrier film 12 by a roll coating process or by a wire coating process or by a blade coating method or the like. The image transfer layer 14 may cover an entire surface of the carrier film 12 or only selected portions or areas thereof.

The carrier film 12 may be applied over an entire side surface of the sheet 10 or may be applied to a portion or portions of the sheet 10, as stated above, in order to position image transfer material in a limited desired location or locations on a sheet 10. Thus, a unit 16 is produced which includes the sheet 10, the carrier film 12 and the image transfer material or layer 14 and may appear substantially as illustrated in FIG. 3.

FIG. 4 illustrates the process of collating a plurality of units 16 and a receptor sheet 20. The units 16 and the sheet 20 thus form a set or a unit set.

FIG. 5 illustrates the manner in which information is applied to a unit or units 16 of the set. The receptor sheet 20 rests upon any suitable support structure 22. An impact or pressure member 24, such as a typewriter element or print element or the like, has an impression surface which engages the surface of the sheet 10 of the upper unit 16 and may print thereupon or may only apply image pressure thereupon. Usually, however, printing action occurs on the upper surface of the upper sheet 10 by image pressure of the member 24. When print action occurs, any suitable inking means is disposed between the pressure member 24 and the upper surface of the upper sheet 10. Simultaneously, the image pressure is applied to the sheet 10, film 12, and transfer layer 14 in each of the lower positioned units 16, and the image pressure is applied to the receptor sheet 20. Thus, a portion of the transfer material in a pattern conforming to the shape of the pressure member 24 moves from each image transfer layer 14 to the sheet 10 or 20 which is in engagement therewith, as illustrated in FIG. 5. Such portion of the image transfer layer 14 transferred may be a solid portion of the image transfer layer 14 or image transfer may involve release of a portion of a liquid ink contained in the image transfer layer 14. It is to be understood that printing action other than that shown and discussed may be employed with regard to business forms of this application.

The transfer image layer may be a permanently colored type, such as the wax based, solvent based, or plastisol type referred to above, or it may be essentially colorless until after image-wise transfer to a sheet or surface. Such a colorless transfer image layer contains a chromogenic agent which reacts chemically with another material in or on the surface of the sheet receiving the transferred portion of the imaging layer, thus producing a chemical product of contrasting color. The chromogenic agent may be one of the well known leuco dyes used in conventional chemical copy products or any other agent chosen for its color-forming property. It may be liquid or solid and may be enclosed in microcapsules, or may be incorporated as a solute or dispersed phase within the transfer image layer.

Each unit 16 may be a continuous strip or web. Alternatively, each unit 16 may be an individual unit of suitable width and length dimensions.

Following impressioning or the application of information to superposed units 16 and to the sheet 20 in a manner such as that illustrated in FIG. 5, the units 16 and the sheet 20 are separated or decollated. Thus, individual units 16 and the sheet 20, as a separate sheet, are again provided.

Then each unit 16 may be operated upon as desired to separate the image transfer layer 14 from the sheet 10, by removal of the carrier film 12 from the sheet 10. Any suitable means and/or method may be used for separation of the carrier film 12 from the sheet 10. When each unit 16 is continuous, the unit 16 may be operated upon in a manner such as that illustrated in FIG. 6 for separation of the carrier film 12 from the sheet 10. A leading edge portion of the film or layer 12 is first separated from the sheet 10. Then the sheet 10 is moved in one direction, while the carrier film 12, with the image transfer layer 14 thereupon, is moved in another direction. Such action may be referred to as peeling action. A drum 26 may be used for such separation operation, as shown in FIG. 6. The carrier film 12 is thus removed from the sheet 10 as the sheet 10 moves forwardly from the drum 26, while the carrier film 12, with the image transfer layer 14 carried thereby, is moved downwardly from the drum 26 for separation of the carrier film 12 and the image transfer layer 14 from the sheet 10.

In accordance with this invention, a plurality of units 16 may be assembled as a unit set, as the units 16 are collated in the manner illustrated in FIG. 4. Then after impressioning thereupon in the manner illustrated in FIG. 5, the films 12 may be removed from the sheets 10 in substantially straight line movement, in the manner illustrated in FIG. 7. Such action may be referred to as shear action.

Separation of the carrier film 12 from the sheet 10 as illustrated in FIG. 6 or as illustrated in FIG. 7 may be performed manually or by machine and may be referred to as stripping action. The word "strip", "stripping", or "strippable" as used in this application includes not only separation action by which there is angular peeling movement between the sheet 10 and the sheet 12, as illustrated in FIG. 6, but also includes separation by shearing action, as illustrated in FIG. 7, and also includes any other type of action by which separation of the film 12 from the sheet 10 occurs. Due to the fact that the attachment or bond of the carrier film 12 to the sheet 10 is relatively weak, as discussed above, the stripping or separating action illustrated in FIGS. 6 and 7 or by any other action or movement or method can be readily performed.

Thus, in summary, each sheet 10 serves as support means for a film 12 which carries image transfer material 14. The sheet 10 also serves as means through which pressure is transmitted to the film 12 and to the image transfer material 14 for transfer of a portion of the image transfer material 14 to a subjacent sheet or surface. Then after use of the sheet 10 as a carrier means and as means through which image pressure is transmitted, the transfer material 14 can be removed from the sheet 10 by removal of the film 12 from the sheet 10. Thus, an information business form is produced which is free from transfer material. Printing may be applied to the sheet 10 before, during, or after use of the sheet 10 as a means through which image pressure is transmitted.

The structure of this invention is capable of producing excellent image transfer by pressure. The thickness of a unit 16, including a sheet 10, a carrier film 12, and an image transfer layer 14 is considerably less than the thickness of a sheet 10 and a separate tissue type of carbon paper or transfer sheet having a carbon ink or the like carried thereby. Furthermore, physical characteristics of a thin carrier film 12 having a layer of transfer material, such as set forth above, permit better image transfer therethrough by pressure than is possible by the use of a sheet of conventional carbon paper. The superior images realized by utilizing the carrier film of this invention results partially from the extreme smoothness of the film, which permits the transfer of a greater proportion of the imaging layer than can be realized when the imaging layer is coated directly onto a fibrous surface of a paper sheet. This same effect also affords better economy by use of thinner or lighter imaging layers. Thus, a multiplicity of excellent copies may be made simultaneously by the use of the structure of this invention.

The cost of a set of units made according to this invention is considerably less than that of a conventional set of forms in which transfer sheets are interposed between record sheets.

FIG. 8

FIG. 8 shows a modification in the structure of this invention in which a sheet 50 has a film 52 releasably bonded thereto in the manner set forth above with respect to the sheet 10 and the film 12. As the film 52 is attached to the sheet 50 for support thereby, a layer of image transfer material 54, similar to the layer of image transfer material 14, discussed above, is applied to the film 52. The bonding of the film 52 to the sheet 50 is sufficient to prevent inadvertent stripping of the film 52 from the sheet 50 during application of the image transfer material 54 to the film 52.

At the left-hand portion of FIG. 8, the film 52 is releasably bonded to the sheet 50. However, as the sheet 50, with the film 52 and the layer of image transfer material 54 moves to the right, as illustrated in FIG. 8, the film 52 is stripped or separated from the sheet 50 by a wedge 56, or the like. Then, the film 52, carrying the layer of transfer material 54, is returned to engagement with the sheet 50, by any suitable means, such as a roller 58 or the like. The film 52, carrying the layer of image transfer material 54, is thus in a position to receive image pressure transmitted through the sheet 50. Thus, image pressure is transmitted through the sheet 50, the film 52 and the transfer material 54 after removal of the bonded relationship between the sheet 50 and the film 52, rather than prior to such removal of the bonded relationship. Thus, after transmission of image pressure through the sheet 50, the film 52, and the transfer material 54, for transfer of a portion of the image transfer material, separation of the film 52 and the transfer material 54 from the sheet 50 occurs by a conventional type of decollating action, not shown, as distinguished from stripping action, illustrated in FIGS. 6 and 7.

FIG. 9

FIG. 9 shows a sheet 60 to which a film 62 is releasably bonded. The film 62 is similar to the film 12 and carries transfer material 64, similar to the transfer material 14.

As illustrated in FIG. 9, by relative movement between the sheet 60 and a wedge 66, the film 62 is stripped or separated from the sheet 60 and carries the layer of transfer material 64 therewith.

Then, the film 62, carrying the layer of transfer material 64, is moved to a sheet 68 which is movably supported by any suitable means, such as a roll 70. Thus, the sheet 68 then supports the film 62 and the layer of transfer material 64. However, as illustrated in FIG. 9, the layer of transfer material 64, rather than the film 62, moves into engagement with the sheet 68. Thus, the film 62, the layer of transfer material 64 and the sheet 68 appear as illustrated in FIG. 12. In some situations the layer of transfer material 64 becomes releasably bonded to the sheet 68, as by built-in tack in the transfer material, by electrostatic attraction, or by suitable adhesives.

As illustrated in FIG. 12, the sheet 68 may rest upon any suitable support member, such as a member 72, for impressioning by an impact or pressure member 74. Thus, image-wise pressure is applied to the transfer material 64 and an image is produced on the upper surface of the sheet 68, without the need of a separate print ribbon or the like. Such structure is particularly advantageous in high speed printer operation and the like. Furthermore, the transfer material 64 after application to the sheet 68, is covered by the film 62 and the transfer material 64 is thus prevented from smudging.

FIGS. 10 AND 11

FIG. 10 shows an elongate sheet 80 which has a film 82 releasably bonded thereto. The film 82 carries a layer of transfer material 84. The sheet 80 with the film 82 and the layer of transfer material 84 is in a coil or roll upon a spool 86 and is shown extending therefrom. In order to cause the sheet 80 to carry the layer of transfer material 84 directly thereupon, with the film 82 protecting the layer of transfer material 84, a procedure illustrated in FIG. 11 is employed.

The film 82 is stripped from the lower surface of the sheet 80, as the sheet 80 extends from the coil thereof shown in FIG. 10. The film 82 is first stripped from the lower portion of the sheet 80 and in a clockwise direction along the outer portion of the coil to the position illustrated in FIG. 11. Then the layer of transfer material 84 is laid upon the upper surface of the sheet 80, as illustrated in FIG. 11, and then the sheet 80 and the film 82, carrying the transfer material 84, are drawn from the coil thereof, as illustrated in FIG. 11. As this movement of the sheet 80 with the layer of transfer material 84 in engagement therewith occurs, the film 82 is stripped from the sheet 80, as illustrated in FIG. 11. In this manner, the sheet 80, the layer of transfer material 84 and the film 82 may appear as illustrated in FIG. 12, with respect to the sheet 68, the layer of transfer material 64 and the film 62. In this manner, impressioning may be applied to the sheet 80 through the film 82 and the transfer material 84, in the manner illustrated in FIG. 12, with respect to the sheet 68, the layer of transfer material 64, and the film 62. If desired, the layer of transfer material 84 may be bonded to the upper surface of the sheet 80.

FIG. 13 shows a substrate 90, which may be a sheet or strip or the like. A layer of transfer material 92 lies on the upper surface of the substrate 90. Immediately above the layer of transfer material 92 is a film or carrier 94, and immediately above the film 94 is a layer of transfer material 96.

Structure such as shown in FIG. 13 can be produced by the procedures shown in FIGS. 9, 10 and 11, by which the film 94, having a layer of transfer material 92 thereupon, is stripped from one sheet and laid upon another sheet with the layer of transfer material 92 in engagement with the second sheet, followed by application of a layer 96 of transfer material to the other surface of the film 94.

Preferably, the layer of transfer material 92 is releasably bonded to the substrate 90, at least at limited spots or areas 98, after being laid upon the substrate 90 or while being laid upon the substrate 90. Then, as the substrate 90, the layer 92 and the film 94 are attached together, a layer of transfer material 96 is applied to the upper surface of the film 94.

The structure shown in FIG. 13 is used in form sets in which another record sheet may be positioned upon the layer 96 for application of transfer material thereto from the layer 96 as pressure is applied toward the overlying sheet. The substrate 90 is adapted to receive transfer material from the layer 92 as pressure is applied toward the substrate 90.

Referring to FIGS. 14–16 which show a system or apparatus for continuously producing a business form article as described above, a web 110 of paper or similar material, is directed from a driven supply roll 112 between a set of idler or guide rolls 114 to a dancer roll 116. The dancer roll 116 is rotatably supported by a set of pivotal arms 117 which operate to control the drive for the supply roll 112 and thereby control the tension within the web 110. From the guide rolls 114, the paper web 110 is directed around a wrinkle removing Mt. Hope or bowed roll 118 to a guide roll 119 which is positioned directly below a plastics extruder 120.

The plastics extruder 120 includes a heated extruder head 122 defining a narrow discharge slot which extends laterally across the path of the paper web 110. A continuous film 125 of plastics material, such as medium low density polyethylene, is extruded downwardly from the discharge slot of the extruder head 122 and is directed into engagement with the paper web 110 (FIG. 15) as the web is directed downwardly from the guide roll 119. The web and film 125 are then directed around a driven water-cooled chill roll 127. As the film 125 leaves the extruder head 122, it has a thickness of approximately 0.010 inch and a melt temperature preferably within the range of 580° to 620° F., which is the temperature of the extruder head 112 adjacent the discharge slot. The web 110 is fed at a speed which is substantially greater than the linear flow rate speed of the film 125 as it is extruded from the extruder head 122. This speed is approximately 50 times the speed of the film. As a result, the extruded film 125 is stretched substantially so that after the film 125 is coated on the web 110, the film has a thickness less than 0.0005 inch and preferably on the order of 0.0002 inch.

The tension in the paper web 110, as the web feeds into contact with the extruded film 125 and around the chill roll 127, is important. This tension is precisely controlled to form relatively light or weak self-bonding of the film 125 to the paper web 110 after the film is cooled by the chill roll 127. As mentioned above, this web tension is controlled by the dancer roll 116 and preferably is maintained within a range of ½ to 4 pounds per inch of web width. Thus the web tension cooperates with the temperature and flow rate of the film 125 from the extruder head 122 to provide the light degree of self-bonding so that the film 125 can subsequently be conveniently and quickly separated, or stripped or peeled from the paper web 110.

After the paper web 110 receives the coating of film 125 and is cooled by the chill roll 127, the laminate or assembly of the web 110 and film 125 is directed partially around a guide roll 129 and then over the top of a pair of rollers 132 (FIG. 16). The rollers 132 are mounted on a cross-shaft 133 and are positioned under the opposite margins or edge portions of the web 110. Each of the rolls 132 includes a soft rubber outer layer 136 which provides a resilient outer surface having a durometer of approximately 30. As shown in FIG. 16, each edge portion of the paper web 110 is supported by the outer resilient surface of the corresponding roller 132. A circular knife 138 is supported directly above each of the rolls 132 by a shaft 139 which is rotatably supported by pivotal support arms 141 so that the knives 138 are free to float. Each of the knives 138 has a sharp razor-like outer edge and, when rotated at a surface speed greater than web speed, is effective to cut through the film 125 carried by the paper web 110, but not through the paper web 110.

As soon as the film 125 is extruded from the extruder head 122, the film begins to cool, and the edges of the film shrink laterally inwardly. As a result, after the film 125 is stretched and coated onto the higher speed web 110, the edge portions 142 of the film have a thickness greater than the intermediate or center portion of the film 125 on the web 110. These edge portions 142 of the film are trimmed from the intermediate portion of the film and the paper web 110 by the cooperation between the rotary knives 138 and the resilient outer surfaces of the corresponding back-ups or support rolls 132. The shaft 139 supporting the circular knives 138, is driven by a drive 144 so that the peripheral speed of the knives 138 is, preferably, from three to fives times the speed of the web 110. However, higher rates of peripheral speed may also be satisfactory. After the edge portions 142 of the film 125 are severed from the intermediate or center portion of the film on the web 110, the edge portions of the film are peeled or stripped away from the underlying edge portions of the paper web 110. The edge portions 142 of the film 125 are directed around a guide roll 146 to a suction system (not shown) which is used for collecting the thin strips or edge portions of the film 125.

After the paper web 110 and lightly self-bonded film 125 leave the stripping roll 146, the laminate or assembly is directed through a coating unit 150 which applies a coating 152 of image transfer material to the exposed surface of the film 125. This coating may be of the hot melt type or of the water base type and may be applied in a continuous manner as shown in FIG. 14 or in spots or stripes to only portions of the film 125. The coating unit 150 illustrated includes an impression cylinder or roll 154 which supports the paper web 110, and the coating formulation is applied from a fountain roll 156 to the film 125 by a set of transfer rolls 158 and 159. When the image transfer material is of the water base type, the assembly of the paper web 110, the film 125 and coating 152 is directed through an oven-type dryer 160. However, when the image transfer material is of the hot melt type, the dryer unit 160 is not necessary.

Other types of image transfer materials may advantageously be applied by other coating processes, not shown, such as gravure, trailing blade, air knife, etc.

After the water base coating 152 of the image transfer material is dried within the dryer 160, the web 110 carrying the film 125 and coating 152, is directed over a guide roll 162 and around a water-cooled chill roll 164 to provide for cooling the coating 152 heated in the dryer 160. The assembly of the web 110, film 125 and coating 152, is then looped downwardly between a set of guide rolls 166 and around a dancer roll 168 which is supported by a set of pivotal arms 169. From the guide rolls 166 and the dancer roll 168, the assembly is directed in some situations to an elongate releasing or stripping roller or member 175 in the form of a cylindrical rod which extends laterally across the path of the web 110. The stripping roller or member 175 is driven by a drive 177 and is effective to peel or strip the film 125 and the coating 152 carried by the film, from the paper web 110. The stripping member 175 has a diameter of approximately 1 inch and has a peripheral speed the same as the film 125, which is slightly in excess of the speed of the paper web 110.

The separated film 125, carrying the carbon coating 152, is then directed back into engagement or contact with the paper web 110 under a roller 179 which is also driven by the drive 177 in a direction opposite to the direction of the stripping roller or member 175. The film 125 and coating 152 are then carried by the paper web 110 over a set of guide rollers 182, and the web 110 and coated film 125 are rewound into a roll 185 so that the thin film 125 remains in contact with the paper web 110 and is maintained free of wrinkles and creases. The dancer roll 168 controls the drive for the rewind roll 185 so that a constant predetermined tension is maintained within the paper web 110 during the stripping operation by the stripping roller or member 175.

Although the preferred embodiments of the structure and apparatus have been described, it will be understood that within the purview of this invention, various changes may be made in the form, details, proportion and arrangement of parts, the combination thereof and methods of production, without departing from the scope and spirit of the invention, as defined in the appended claims.

The invention having thus been described, the following is claimed:

1. Apparatus for producing a continuous business form article, comprising means for directing a paper web from a supply roll along a predetermined path, means for extruding a continuous thin film of plastics material onto the paper web, means for producing a releasable bond between the thin film and the paper web including means for precisely controlling the pressure of the film against the paper web, means for coating a layer of image transfer material onto at least a portion of the film, and means for rewinding the paper web while the composite film and the layer of image transfer material are carried by the paper web.

2. Apparatus as defined in claim 1 including means for trimming the edge portions of said film on the web laterally inwardly of the edges of the web without cutting the web, and means for removing the edge portions of the film from the path of the web.

3. Apparatus as defined in claim 2 wherein said means for trimming the edge portions of the film, comprise at least one roller supporting the edge portion of the web and the film and having a resilient outer surface engaged by the web, a circular knife engaging the film, and means for rotating said knife to effect a peripheral speed greater than the linear speed of the web.

4. Apparatus as defined in claim 1 including means for controlling the longitudinal tension of the web adjacent said extruding means to provide a web tension within a range of ½ to 4 pounds per inch of width of the web.

5. Apparatus as defined in claim 1 wherein said extruding means comprise an extruder head having means defining a slot extending laterally across the web, and means for maintaining the temperature of said extruder head adjacent said slot within a range of between 580°F and 620° F.

6. Apparatus as defined in claim 1 including means for longitudinally cutting the film without cutting the paper web to form a film strip, and means for removing the film strip from the paper web.

7. Apparatus as defined in claim 6 wherein said means for cutting the film comprise a roller supporting the paper web and having a resilient outer surface, a circular knife positioned to engage the film adjacent said roller, and means for rotating the knife to effect a peripheral speed greater than the linear speed of the paper web.

8. Apparatus for producing a continuous business form article, comprising means for directing a paper web from a supply roll along a predetermined path, means for extruding a continuous thin film of plastics material onto the paper web, means for stretching the film as it is applied to the paper web to provide a film thickness less than .0005 inch, means for producing a releasable bond between the thin film and the paper web including means for precisely controlling the pressure of the film against the paper web, means for coating a layer of image transfer material onto at least a portion of the film, and means for rewinding the paper web while the composite film and the layer of image transfer material are carried by the paper web.

9. Apparatus for producing a continuous business form article, comprising means for directing a paper web from a supply roll along a predetermined path, means for extruding a continuous thin film of plastics material onto the paper web, means for producing a releasable bond between the thin film and the paper web including means for precisely controlling the pressure of the film against the paper web, roller means for longitudinally cutting the film without cutting the paper web to form a film strip, means for removing the film strip from the paper web, means for coating a layer of image transfer material onto at least a portion of the film, and means for rewinding the paper web while the composite film and the layer of image transfer material are carried by the paper web.

10. Apparatus for producing a continuous business form article, comprising means for directing a paper web from a supply roll along a predetermined path, means for extruding a continuous thin film of plastics material onto the paper web, means for stretching the film as it is applied to the paper web to provide a film thickness less than 0.0005 inch, means for producing a releasable bond between the thin film and the paper web including means for precisely controlling the pressure of the film against the paper web, means for coating a layer of image transfer material onto at least a portion of the film, means for releasing the bond between the film and the paper web, and means for rewinding the paper web while the composite film and the layer of image transfer material are carried by the paper web.

11. Apparatus as defined in claim 10 wherein said means for releasing the bond of the film, comprise an elongate cylindrical stripping member positioned between the web and the film, and means for rotating said stripping member.

* * * * *